US010659577B2

(12) United States Patent
Nam et al.

(10) Patent No.: US 10,659,577 B2
(45) Date of Patent: May 19, 2020

(54) HINGE FOR A FOLDABLE-TYPE MOBILE DEVICE

(71) Applicant: LG ELECTRONICS INC., Seoul (KR)

(72) Inventors: Hosung Nam, Seoul (KR); Bohyoung Lee, Seoul (KR); Seyong Kim, Seoul (KR); Sungpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 15/756,869

(22) PCT Filed: Nov. 17, 2015

(86) PCT No.: PCT/KR2015/012327
§ 371 (c)(1),
(2) Date: Mar. 1, 2018

(87) PCT Pub. No.: WO2017/039064
PCT Pub. Date: Mar. 9, 2017

(65) Prior Publication Data
US 2018/0255162 A1    Sep. 6, 2018

(30) Foreign Application Priority Data

Sep. 3, 2015  (KR) .................... 10-2015-0124765

(51) Int. Cl.
*H04M 1/02*     (2006.01)
*G06F 1/16*     (2006.01)

(52) U.S. Cl.
CPC ........ *H04M 1/0233* (2013.01); *G06F 1/1615* (2013.01); *G06F 1/1626* (2013.01);
(Continued)

(58) Field of Classification Search
CPC ............ H04M 1/0233; H04M 1/0227; H04M 1/0231; H04M 1/0247; G06F 1/1683;
(Continued)

(56) References Cited

U.S. PATENT DOCUMENTS 9,173,287 B1 * 10/2015 Kim ................. H05K 1/028
9,179,559 B1 * 11/2015 Kim ................. G06F 1/1616
(Continued)

FOREIGN PATENT DOCUMENTS

KR   1-2002-011727-3   *   1/2002
KR   10-2010-0079459 A      7/2010
(Continued)

*Primary Examiner* — Edward F Urban
*Assistant Examiner* — Angelica M Perez
(74) *Attorney, Agent, or Firm* — Birch, Stewart, Kolasch & Birch, LLP

(57) ABSTRACT

A hinge module including a first body; a second body arranged with respect to the first body; a hinge configured to hinge in response to an angle variation between the first body and the second body; and a display disposed on the first body and the second body. Further, the hinge includes a first hinge housing including an accommodating portion; a second hinge housing having a first end inserted in the accommodating portion; an arc-shaped hinge hole in the second hinge housing; a hinge pin projecting from an inner surface of the accommodating portion of the first hinge housing and penetrating the arc-shaped hinge hole in the second hinge housing; a guide pin coupled to the first hinge housing and inserted into a second end of the second hinge housing; and an elastic member provided in the second end of the second hinge housing and including a curved surface contacting the guide pin.

20 Claims, 13 Drawing Sheets

(52) U.S. Cl.
CPC .......... *G06F 1/1652* (2013.01); *G06F 1/1681* (2013.01); *H04M 1/0216* (2013.01); *H04M 1/0227* (2013.01); *H04M 1/0231* (2013.01); *H04M 1/0247* (2013.01); *G06F 1/1683* (2013.01)

(58) Field of Classification Search
CPC ...... H05K 5/0017; H05K 5/00; H05K 5/0052; H05K 5/0226
USPC ...................................................... 455/575.3
See application file for complete search history.

(56) References Cited

U.S. PATENT DOCUMENTS

| | | | |
|---|---|---|---|
| 2011/0263304 | A1* | 10/2011 | Laido .................... G06F 1/1616 455/575.3 |
| 2015/0153787 | A1 | 6/2015 | Mok et al. |
| 2016/0153222 | A1* | 6/2016 | Hu ........................ G06F 1/1681 361/679.55 |
| 2016/0205792 | A1* | 7/2016 | Ahn ..................... H05K 5/0017 40/779 |
| 2016/0327994 | A1* | 11/2016 | Lee ....................... G06F 1/1618 |

FOREIGN PATENT DOCUMENTS

| | | |
|---|---|---|
| KR | 10-2014-0002243 A | 1/2014 |
| KR | 10-2015-0037383 A | 4/2015 |
| KR | 10-2015-0069983 A | 6/2015 |

\* cited by examiner (a)

(b)

(a)

(b)

HINGE FOR A FOLDABLE-TYPE MOBILE DEVICE

CROSS REFERENCE TO THE RELATED APPLICATIONS

This application is the National Phase of PCT International Application No. PCT/KR2015/012327, filed on Nov. 17, 2015, which claims priority under 35 U.S.C. § 119(a) to Patent Application No. 10-2015-0124765, filed in Republic of Korea on Sep. 3, 2015, all of which are hereby expressly incorporated by reference into the present application.

BACKGROUND OF THE INVENTION

Field

Embodiments of the present disclosure relate to a mobile terminal which is bendable.

Discussion of the Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

A display is formed in a rectangular shape having one long side. When playing a movie or game, a user arranges the display longitudinally in a horizontal direction to use. In case of viewing the image on the entire area of the display as one screen, a curved display is effective for a sense of immersion.

In this instance, the mobile terminal having such a curved display has to be formed in a curved shape and it is disadvantageously inconvenient of a user to use the mobile terminal having the curved shape.

SUMMARY

To overcome the disadvantages, an object of the present invention is to address the above-noted and other problems and to provide a bendable mobile terminal and a control method thereof.

To achieve these objects and other advantages and in accordance with the purpose of the embodiments, as embodied and broadly described herein, a mobile terminal comprises a first hinge housing comprising an accommodating portion provided therein, the accommodating portion having one x-axis direction side which is blocked and the other side which is open; a second hinge housing having one x-axis direction side which is inserted in the accommodating portion; an arc-shaped hinge hole formed in the second hinge housing and open in a y-axis direction; a hinge pin projected from an inner surface of the accommodating portion of the second hinge housing and penetrating the hinge hole; a guide pin coupled to the other x-axis direction side of the first hinge housing in the y-axis direction; and an elastic member provided in the other x-axis direction side of the second hinge housing and comprising a curved surface which contacts with the guide pin.

One x-axis direction end of the second housing may contact with one end of an inner surface of the accommodating portion.

The end of the inner surface of the accommodating portion may have an inclined surface which is oblique in a z-axis direction.

The mobile terminal may further comprise a plate spring provided in an inner cross section of the accommodating portion and having unevenness.

The inner cross section of the accommodating portion may comprise POM (Poly Oxy Methylene).

The arc-shape of the hinge hole may have a center point which is located in an outside with respect to the z-axis direction of the hinge module.

The hinge hole may comprise two hinge holes which are spaced apart in the z-axis direction.

The hinge hole may have an arc shape with the same center point of the two hinge holes.

The elastic member may comprise a plate spring which is coupled to the second housing and has unevenness.

The elastic member may comprise a cam block having a 3-shaped end which contacts with the guide pin; and a spring which applies a force for pulling the cam block toward the other x-axis direction side.

The first hinge housing may comprise a pair of cases which are coupled from both sides in a y-axis direction of the second hinge housing.

Embodiments of the present disclosure may also provide a mobile terminal comprising a first body; a second body arranged in an x-axis direction with respect to the first body; a hinge module configured to facilitate the angle variation between the first body and the second body; and a display unit disposed in a direction where the angle between the first body and the second body becomes smaller, wherein the hinge module comprises a first hinge housing coupled to the first body and comprising an accommodating portion provided therein, the accommodating portion having one x-axis direction side which is blocked and the other side which is open; a second hinge housing coupled to the second body and having one x-axis direction side which is inserted in the accommodating portion; an arc-shaped hinge hole formed in the second hinge housing and open in a y-axis direction; a hinge pin projected from an inner surface of the accommodating portion of the second hinge housing and penetrating the hinge hole; a guide pin coupled to the other x-axis direction side of the first hinge housing in the y-axis direction; and an elastic member provided in the other x-axis direction side of the second hinge housing and comprising a curved surface which contacts with the guide pin.

A pair of hinge modules may be provided in right and left sides of the first and second bodies in the y-axis direction.

The pair of the second bodies may be provided and coupled to both sides of the first body in the x-axis direction, respectively, and the hinge module is arranged in symmetry with respect to the first body.

The mobile terminal may further comprise a rear case coupled in a direction where the angle between the first body and the second body becomes larger, wherein the rear case comprises a first cover coupled to the first body and comprising an overlapped portion extended toward the second body; a second cover coupled to the second body and having a thin area where the overlapped portion is located; and an elastic cover configured to cover lateral surfaces between the first body and the second body from the both y-axis sides of the first and second covers.

The display unit may be coupled to the first body and the second body by using a boss provided in a rear surface of the display unit, and the boss may be arranged in an area which is spaced apart from a connection area between the first body and the second body.

One end of an inner surface of the accommodating portion may have an inclined surface which is oblique in a z-axis direction, and the x-axis direction end of the second housing may contact with the end of the inner surface of the accommodating portion.

The end of the inner surface of the accommodating portion may have an inclined surface which is oblique in the z-axis direction, and a plate spring in which unevenness is formed may be further provided in an inner cross section of the accommodating portion.

The hinge hole may have two hinge holes which are spaced apart in the z-axis direction.

The hinge hole may comprise two hinge holes which are spaced apart in the z-axis direction.

The hinge hole has an arc shape with the same center point of the two hinge holes.

The elastic member may comprise a plate spring which is coupled to the second housing and has unevenness.

The elastic member may comprise a cam block having a 3-shaped end which contacts with the guide pin; and a spring which applies a force for pulling the cam block toward the other x-axis direction side.

Accordingly, the embodiments have following advantageous effects. According to at least one embodiment of the present disclosure, the mobile terminal is capable of adjusting the bending degree of the mobile terminal. Accordingly, the sense of immersion into the screen may be enhanced by adjusting the curvature of the mobile terminal and it may be convenient of the user to rest the mobile terminal easily.

Furthermore, when the mobile terminal is bendably deformed, the surface of the terminal body, on which the display unit is disposed, may have no length variation. Accordingly, the sliding member of the display unit may be omitted and the structure may become simple. Also, the deterioration of the durability caused by the sliding structure may be improved.

Still further, the mobile terminal may provide the tactile sense for sensing the presence of each deformation stages when the bodies are deformed into the bending state or the flat state. Accordingly, the severe deformation of the shape may be prevented and the durability may be improved.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE EMBODIMENTS

Figure 1A:
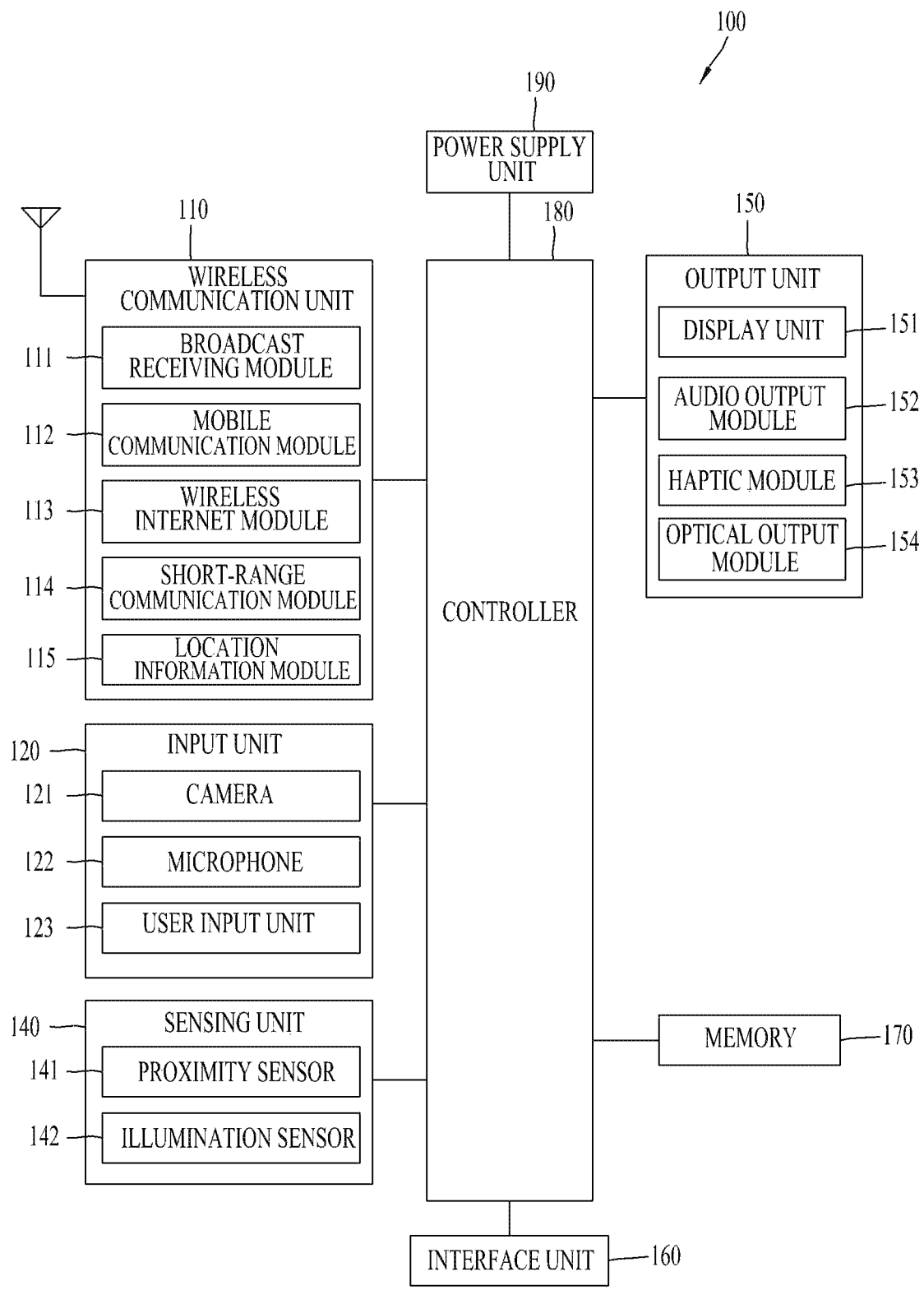
FIG. 1a is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
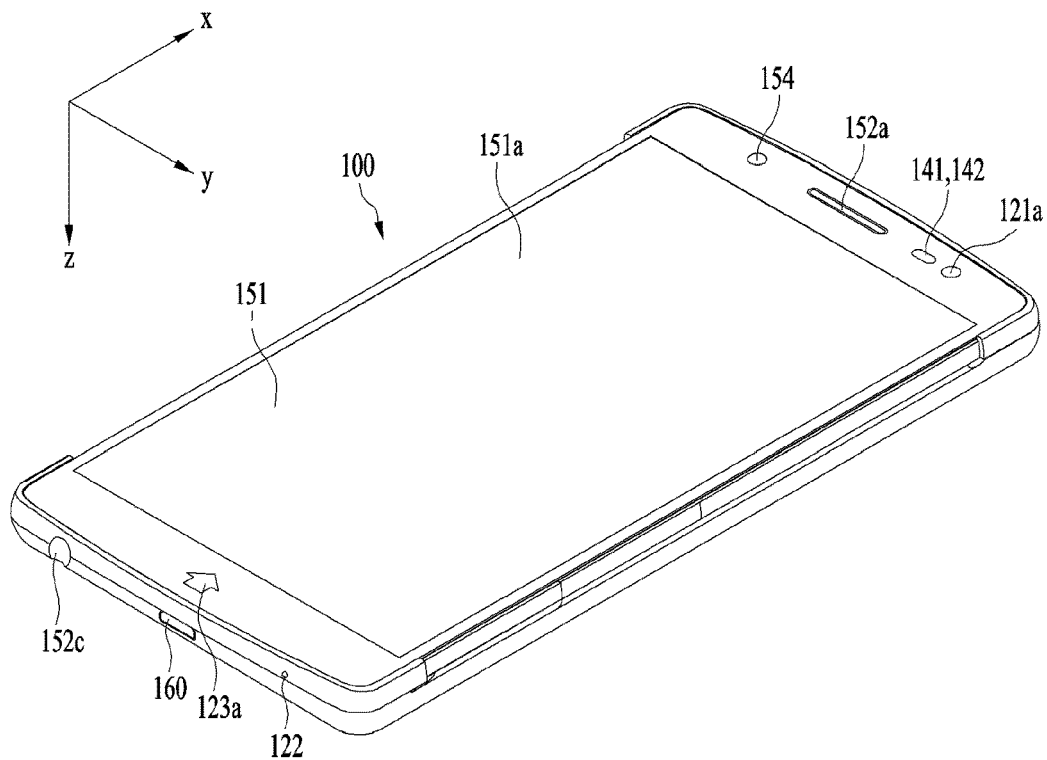
FIGS. 1b and 1c are conceptual views of one example of the mobile terminal, viewed from different directions.
Figure 1C:
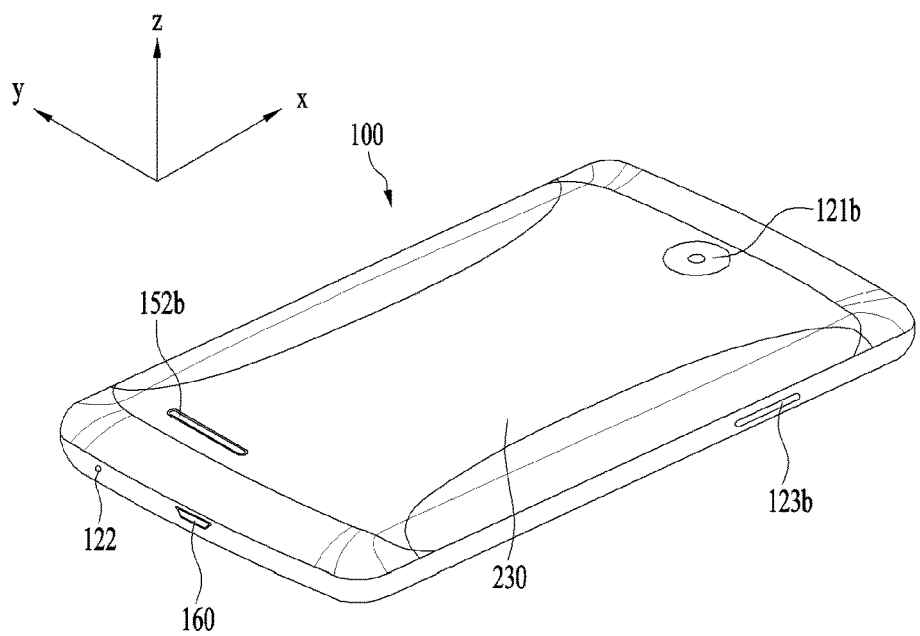

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Referring now to FIGS. 1b and 1c, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

In the illustrated embodiment, a front surface of the front case is covered with the display and the window and rear and lateral surfaces are covered with the rear case 230, so that the front case may not be exposed outside.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the audio output module, the proximity sensor 141, the illuminance sensor 142, the optical output module 154, the camera 121, the user input unit 123, the microphone 122 and the interface unit 160.

Figure 3:
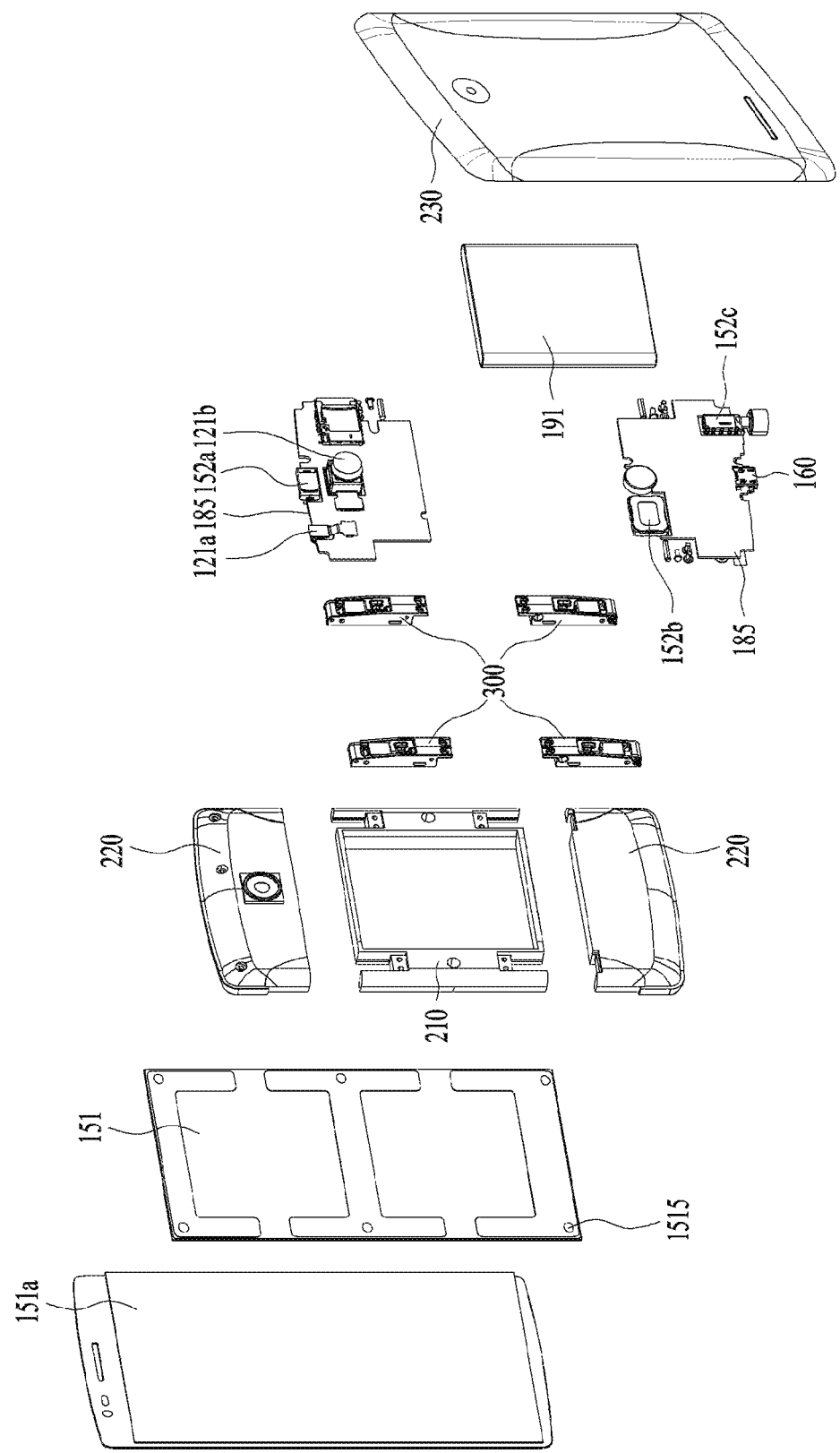
FIG. 3 is an exploded perspective diagram of the mobile terminal.
Figure 4:
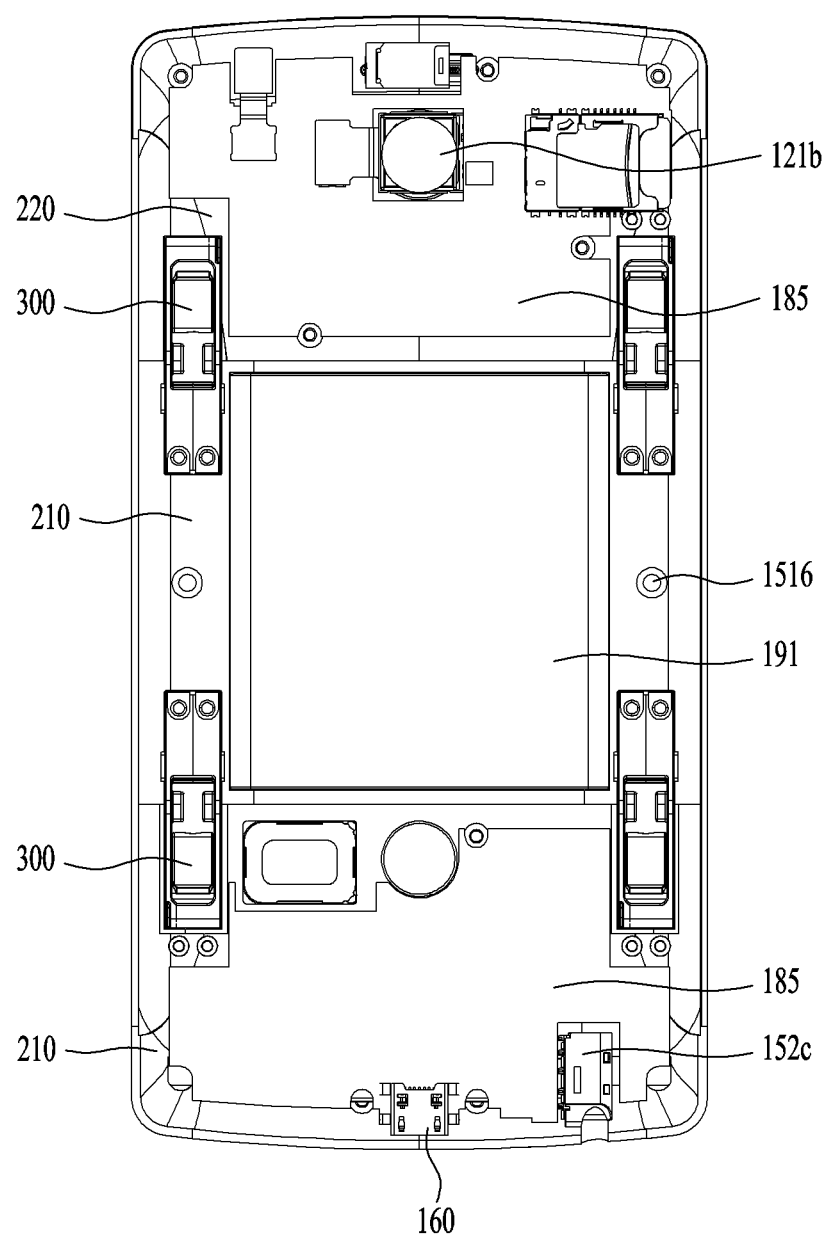
FIG. 4 is a rear view illustrating a state where a rear case is decoupled from the mobile terminal.

It will be described for the mobile terminal as shown in FIGS. 1b and 1c. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body. An audio port 153 is also shown in FIGS. 1b, 3 and 4.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

A flash 124 is shown located adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can be also provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
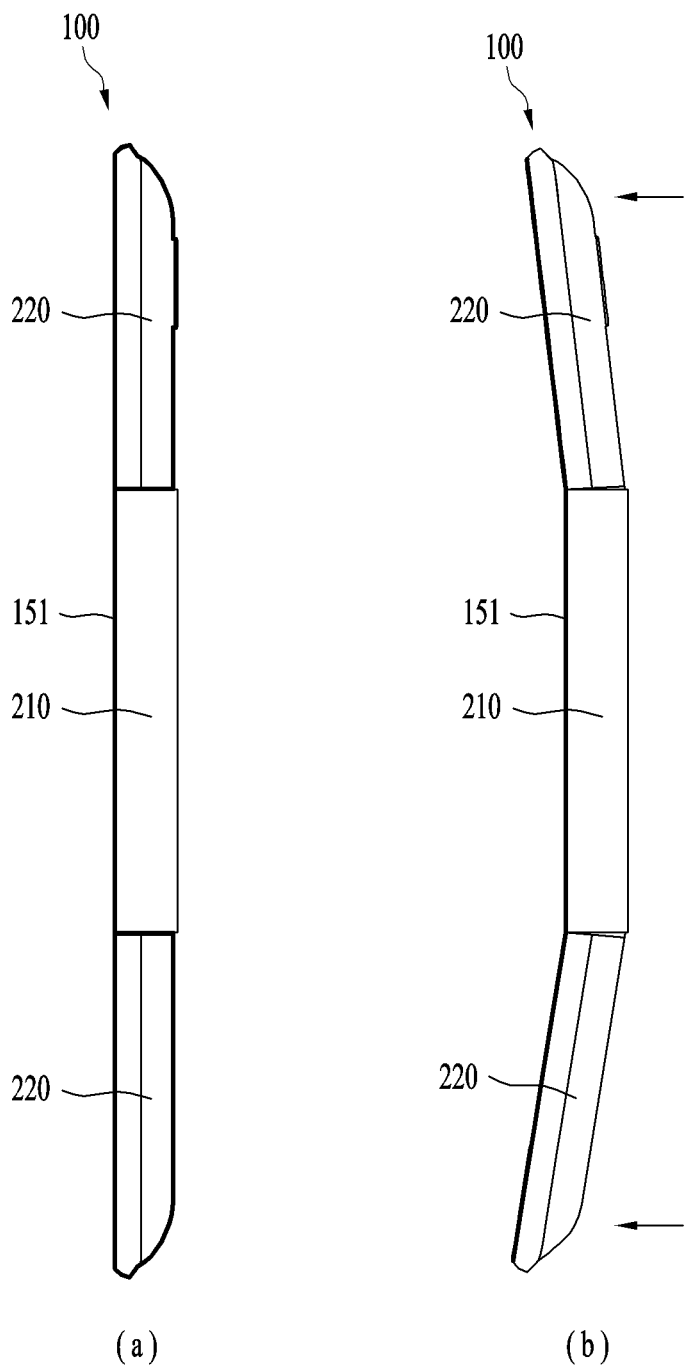
FIG. 2 is a diagram illustrating a lateral surface of the mobile terminal.

FIG. 2 is a diagram illustrating a lateral surface of the mobile terminal and FIG. 3 is an exploded perspective diagram of the mobile terminal. The mobile terminal is divided into the plurality of the bodies 210 and 220 so that each of the bodies 210 and 220 may be curved. The bodies 210 and 220 may be connected via a hinge module 300 and an angle between the bodies 210 and 220 is variable to form a curved surface as shown in FIG. 2.

Hereinafter, the embodiment of the mobile terminal configured of three bodies 210 and 220 will be described and the embodiments of the present disclosure are not limited thereto. Two or more bodies 210 and 220 are coupled to form one mobile terminal. One body located in a middle area of the mobile terminal is defined as 'the first body 210' and the other two bodies located in upper and lower areas with respect to the first body 210 are defined as 'the second body'.

In a rear surface of the bodies 210 and 220 may be loaded a printed circuit board 185, a camera 121*a* and 121*b*, an audio output unit 152*a* and 152*b*, a battery 191 and the like. The rear case 230 may cover the rear surface. The display unit 151 and the window are disposed on a front surface of the bodies 210 and 220. The window is disposed by using a transparent adhesive material such as OCA. A boss 1515 is formed in the rear surface of the display unit 151 and a screw (1516, see FIG. 4) penetrates the bodies 210 and 220 to be fastened to the boss 1515 so as to couple the display unit 151 and the bodies 210 and 220 to each other.

The mobile terminal in accordance with the present disclosure is curvedly bendable as shown in FIG. 2 (*b*) so that the display unit 151 disposed in the connection area between the bodies 210 and 220 may be spaced apart enough to form a gentle curve. The coupling area between the display unit 151 and the bodies 210 and 220 is distant from the connection area of the bodies 210 and 220. As shown in FIG. 3, the bosses 1515 may be arranged only in upper, lower and middle areas of the rear surface, not the connection area between the first body 210 and the second bodies 220.

The rear case 230 which covers the diverse electronic components loaded in the rear surface of the bodies 210 and 220 may include an elastic material to be bendable according to the angle variation of the bodies 210 and 220 or have a segment structure like the structure of the bodies 210 and 220.

FIG. 4 is a rear view illustrating a state where a rear case is decoupled from the mobile terminal. When one hinge module 300 for connecting the first body 210 and the second bodies with each other is provided, there might be de distortion. Accordingly, two hinges may be arranged in right and left areas between the bodies 210 and 220. The pair of the second bodies 220 may be coupled to the top and the bottom of the first body 210 and the hinge modules 300 may be arranged in symmetry with respect to the first body 210. While, the curved surface may become different according to the direction of the hinge module, it is preferred that the hinge modules may be symmetrically arranged with respect to the first body 210 to load the electronic components.

Figure 5:
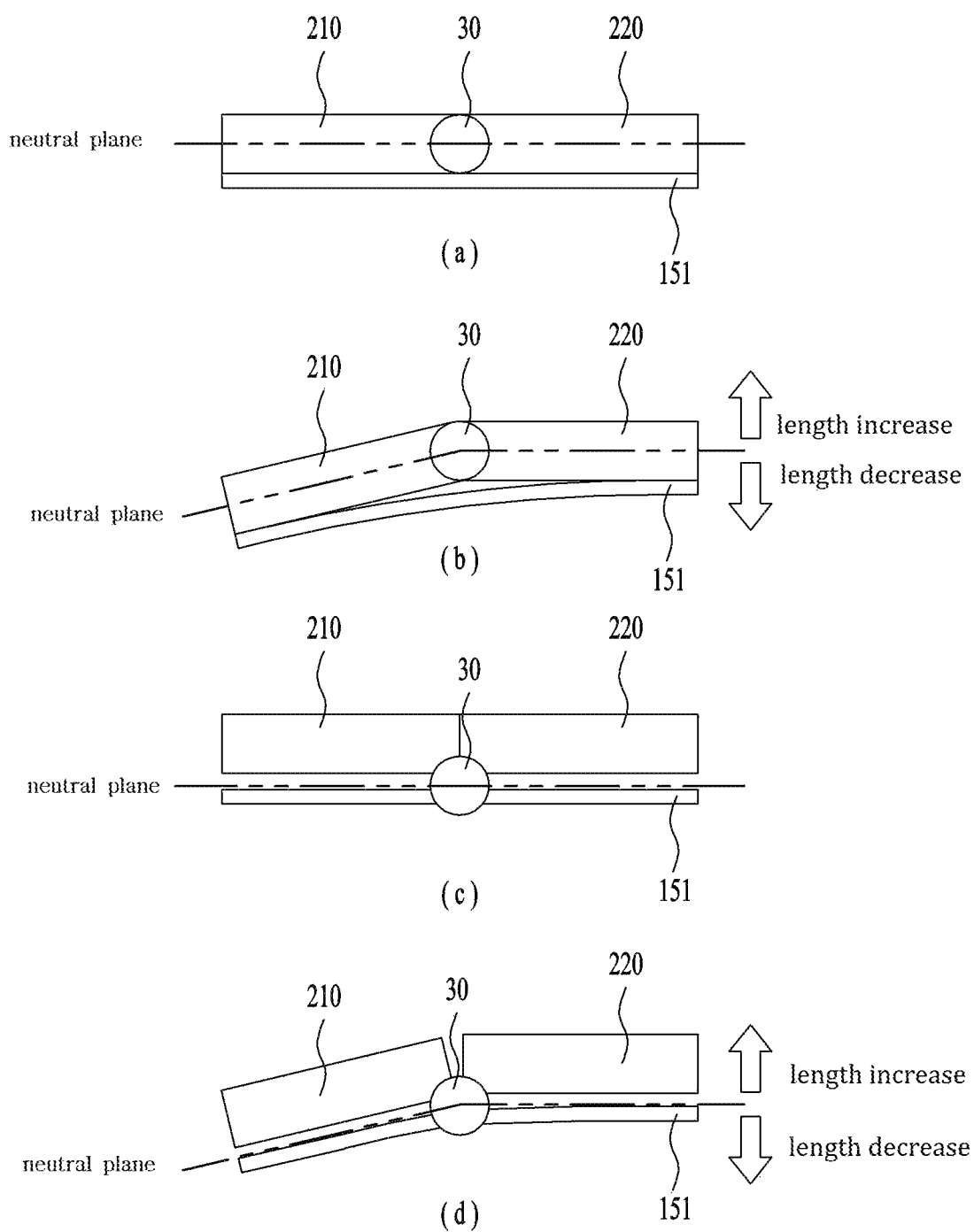
FIG. 5 is a diagram to describe problems of a conventional mobile terminal.

FIG. 5 is a diagram to describe problems of a conventional mobile terminal. The hinge structure shown in FIG. 5 is configured of the first body 210 and the second bodies 220 which are arranged side by side in an x-axis, and a hinge shaft 30 penetrating the bodies. (a) and (b) show that a neutral plane is located in a center area in a direction along the thickness of the first and second bodies 210 and 220 (a z-axis direction). (c) and (d) show that a neutral plane is located in an outside in a direction along the thickness of the first and second bodies 210 and 220 (a z-axis direction).

The structure shown in (a) and (b) is the most conventional hinge structure. In the structure, ends of the two bodies 210 and 220 located on the same plane are overlapped and the hinge shaft 30 penetrates the overlapped ends. Even when the angle between the two bodies 210 and 220 is varied, the x-axis direction length of the neutral plane is not varied and the neutral plane is corresponding to the location of the hinge shaft. When the angle between the two bodies 210 and 220 located on the same plane is changed, the length of the area in the x-axis direction, where the angle becomes smaller with respect to the neutral plane, is reduced disadvantageously and the length of the area in the x-axis direction, where the angle becomes larger, is increased disadvantageously.

When the display unit 151 is arranged in a direction where the angle becomes smaller, the length of the display unit 151 will not be changed. Accordingly, the display unit 151 has to be slidingly coupled to the bodies 210 and 220 disadvantageously. Such a sliding structure has a deteriorated durability, compared with the fixed structure.

To solve the disadvantages, the hinge may be structured to locate the neutral plane on the surface as shown in (c) and (d). When the neutral plane is located on the surface of the bodies 210 and 220 where the display unit 151 is disposed, the length of the display unit 151 will not be changed and such the sliding structure may be omitted.

In this instance, the structure configured of one hinge shaft is projected toward the surface where the display unit 151 is disposed. To realize such the structure, the hinge module 300 has to be arranged in a right-and-left direction of the display unit 151. If the right-and-left bezel of the display unit 151 is increased for the hinge module 300, the overall size of the mobile terminal has to become larger disadvantageously and it is difficult to apply such the structure to the mobile terminal.

To solve the disadvantages, the mobile terminal of the present disclosure provides the hinge module 300 which is located in the rear surface of the display unit 151, while a neutral plane is located in the front surface of the bodies 210 and 220. The hinge module 300 in accordance with the present disclosure provided in the mobile terminal having the display unit 151 will be described, not limited thereto. It may be applicable to the other devices.

Figure 6:
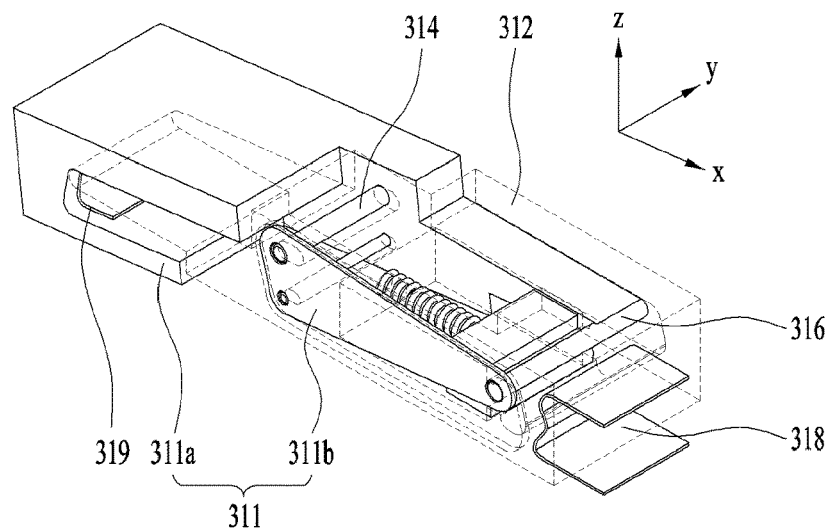
FIG. 6 is a perspective diagram illustrating a first embodiment of a hinge module provided in the mobile terminal.
Figure 7:
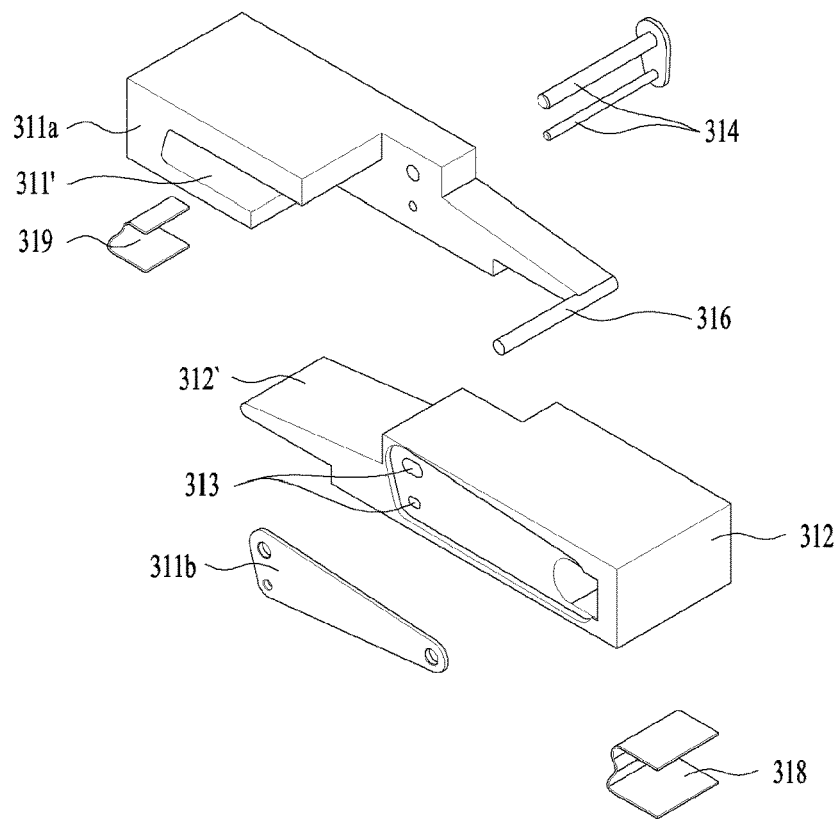
FIG. 7 is an exploded perspective diagram illustrating the hinge module of FIG. 5.
Figure 8:
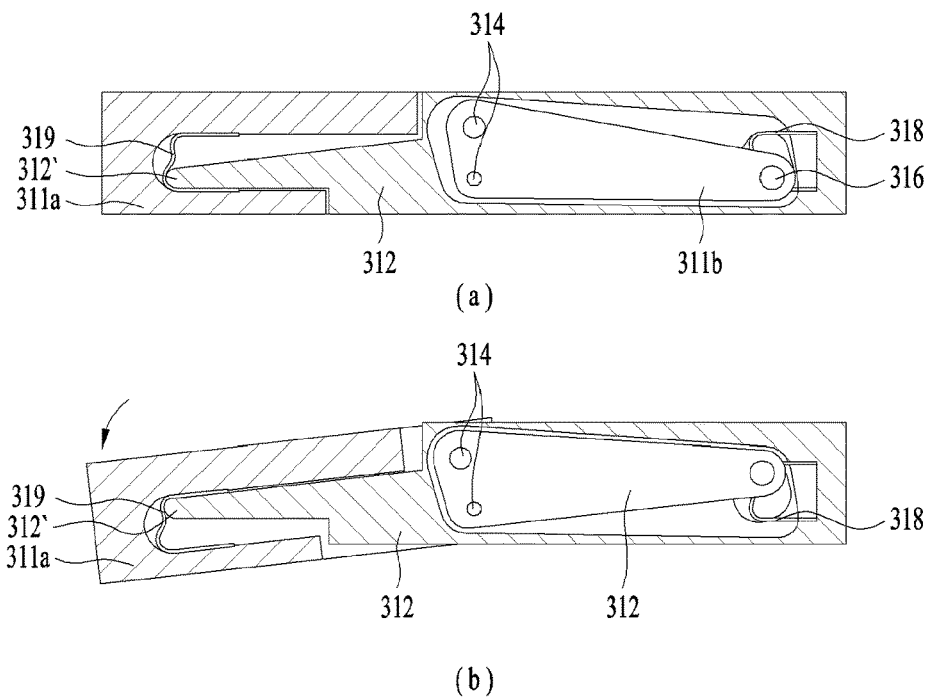
FIG. 8 is a side view illustrating the hinge module of FIG. 5.

FIG. 6 is a perspective diagram illustrating a first embodiment of the hinge module 300 provided in the mobile terminal. FIG. 7 is an exploded perspective diagram illustrating the hinge module 300 of FIG. 5. FIG. 8 is a side view illustrating the hinge module 300 of FIG. 5. The embodiment of the hinge module 300 includes a first hinge housing 311 having a hinge housing 311a and a hinge plate 311b; a second hinge housing 312; an accommodating portion 311'; a hinge hole 313; a hinge pin 314; a guide pin 316; and an elastic member 318.

The first hinge housing 311 includes an accommodating portion 311 coupled to the first body 210 and having one an x-axis direction side which is blocked and the other x-axis direction side which is open. The x-axis direction side means an area which is located in a left side of the drawing and the x-axis direction side means an area which is located in a right side of the drawing.

One side of the second hinge housing 312 is inserted in the first hinge housing 311. The area of the second hinge housing 312 which is inserted in the accommodating portion 311' may be smaller than the accommodating portion 311', while getting thinner and thinner toward the end. One end 312' of the second hinge housing 312 inserted in the accommodating portion 311' may be arranged in contact with a plate spring 319 provided in one end of the accommodating portion 311'.

The plate spring 319 may be made of a plate spring formed in a 3-shape having a projected center. The uneven surface formed in the plate spring may bring an effect that the angle between the first hinge housing 311 and the second housing 312 can be varied step by step, so that the user can have a tactile feedback about completion of angle variation. The end 312' of the second hinge housing 312 is hooked to the unevenness of the elastic member so as to prevent the unintended variation of the angle between the first hinge housing 311 and the second hinge housing 312.

A hinge hole 313 penetrating in a y-axis direction may be provided in the second hinge housing 312. A hinge pin 314 is inserted in the hinge hole 313 and the hinge hole 313 is formed longer than the hinge pin 314, having an arch shape. The arc means a partial area of a circumference, in other words, a curve located at an equal distance from a virtual reference point.

The hinge pin is fixed to the first hinge housing 311, while penetrating the hinge hole 313 and the location of the hinge pin is variable within the hinge hole 313 according to the angle variation between the first body 210 and the second body 220.

Figure 9:
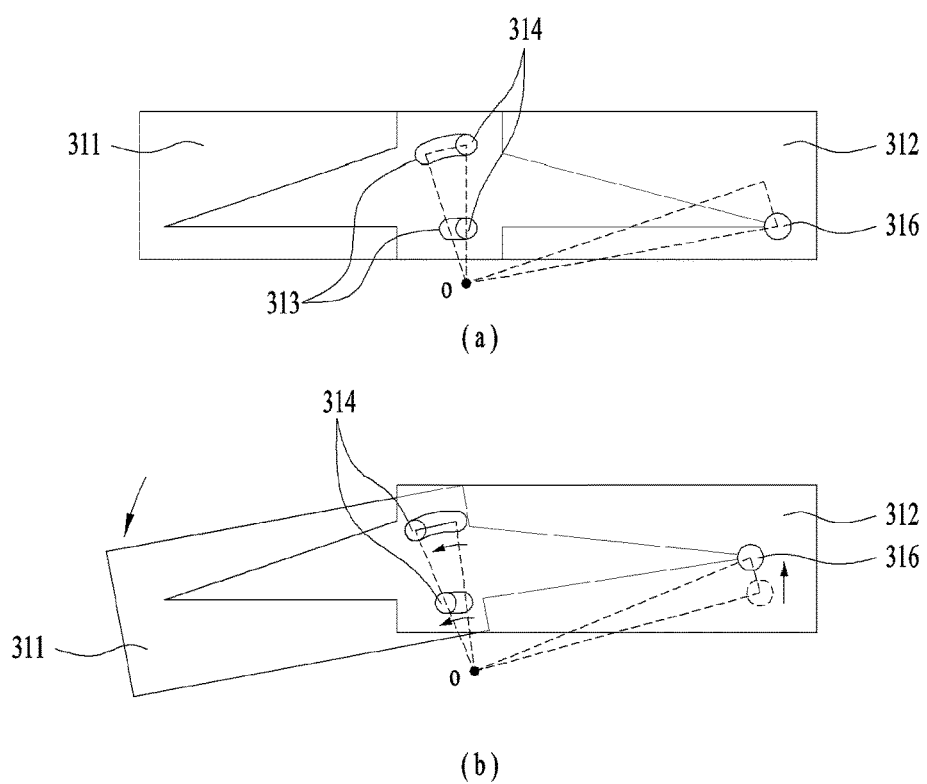
FIG. 9 is a conceptual diagram to describe an operational principle of the hinge module.

FIG. 9 is a conceptual diagram to describe an operational principle of the hinge module 300. (a) shows that the angle between the first hinge housing 311 and the second hinge housing 312 is consistent. The hinge hole 313 is arc-shaped with respect to a center point (o) and the center point (o) is located an outside of the hinge module 300. When it is applied to the mobile terminal, the hinge hole 313 is corresponding to the display unit 151. The area where the center point is located may be the neutral plane of which the x-axis direction length is not changed so that the display unit 151 coupled to the bodies 210 and 220 does not slide.

Two or more hinges holes 313 and two or more hinge pins may be formed. The center of each hinge hole is formed in the arc-shape of concentric circles. When two or more hinges holes and hinge pins are formed, the angles of the first hinge housing 311 and the second hinge housing 312 may be varied more stably. The error that the gap between the first hinge housing 311 and the second hinge housing 312 is widened, not the angles of the first hinge housing 311 and the second hinge housing 312, may be prevented.

The guide pin 316 is coupled to the other x-axis direction of the first housing in a y-axis direction. A hinge plate 311b coupled to the first hinge housing 311 may be further provided to stably fix the hinge pin 314 and the guide pin 316. The hinge plate may be extended more to cover the accommodating portion 311'.

The guide pin may be inserted in a through-hole formed in the other side of the second housing. The guide pin 316 is moving, while drawing an arc with respect to a center point (o), like the hinge pin 314 mentioned above. In other words, the guide pin 316 and the through-hole may be kinds of the hinge pin 314 and hinge hole 313.

The guide pin 316 may contact with the elastic member 318 located in the through-hole. The elastic member 318 is configured to prevent the guide pin 316 from moving toward the x-direction side and the first and second hinge housings 311 and 312 from rotating to get widened in the x-axis direction, not change the angles.

A 3-shaped plate spring may be used as the elastic member 318. When unevenness is formed in the plate spring 318, the guide pin 316 may be hooked in several stages in case of changing the angle between the first hinge housing 311 and the second hinge housing 312. In other words, the user may be provided with a feeling of a tactile feedback about whether the angle between the first hinge housing 311 and the second hinge housing 312 is varied. Also, the unintended variation between the first and second hinge housings 311 and 312 caused by the hinge pin 314 hooked to the unevenness of the elastic member may be prevented.

Figure 10:
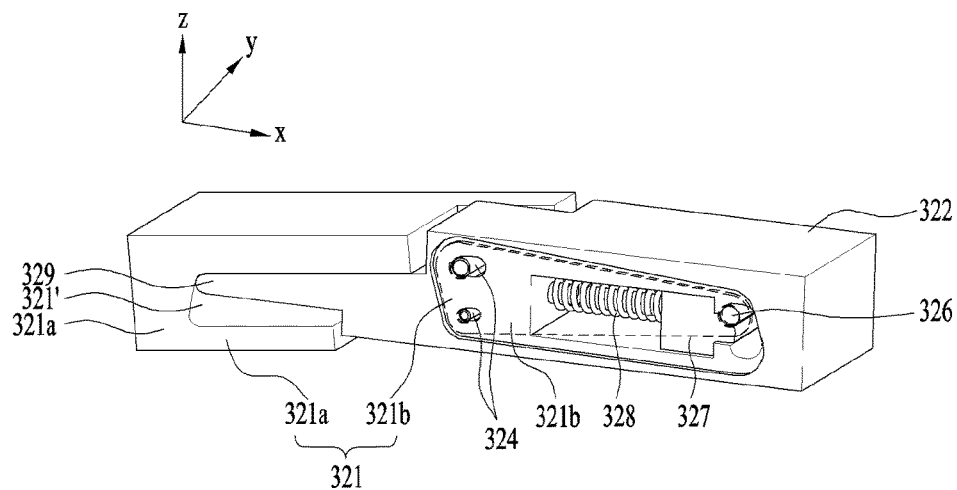
FIG. 10 is a perspective diagram illustrating a second embodiment of the hinge module provided in the mobile terminal.
Figure 11:
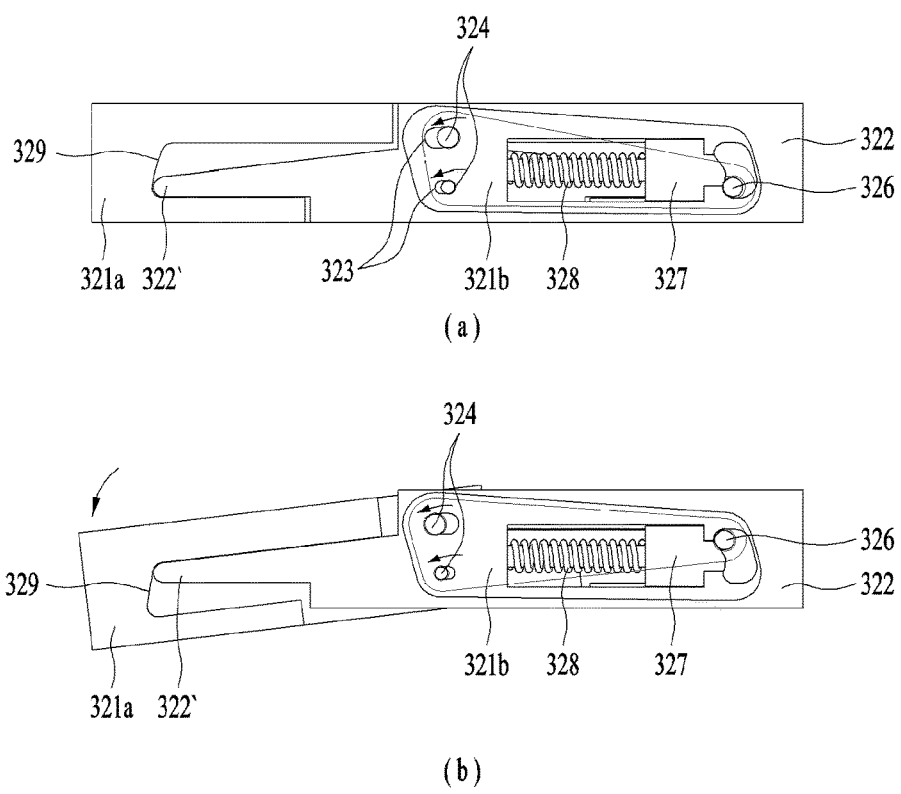
FIG. 11 is a side view illustrating the hinge module of FIG. 10.

FIG. 10 is a perspective diagram illustrating a second embodiment of the hinge module 300 provided in the mobile terminal and FIG. 11 is a side view illustrating the hinge module 300 of FIG. 10. The embodiment of the hinge module 300 includes a first hinge housing 321 having a hinge housing 321a and a hinge plate 321b; a second hinge housing 322; an accommodating portion 321'; a hinge hole 323; a hinge pin 324; a guide pin 326; and an elastic member 328.

This embodiment of the hinge module 300 has the same basic principle with the above embodiment, without the elastic member 328 and the plate spring 319 configured to contact with one end 322' of the second hinge housing 322.

As the elastic member 328 provided in the other side of the second hinge housing 322 provides the feeling of the tactile feedback about the angle variation sufficiently, the plate spring arranged in the end of the second hinge housing 322 is omitted in this embodiment of the hinge module 300.

The number of the components can be reduced and the manufacturing cost may be reduced as well. Even without the plate spring, the end 322' of the second hinge housing 322 is also rotating while drawing the arc with respect to the center point (o). The blocked end of the accommodating portion 321' is formed in an inclined surface 329 or arc shape so as to guide the moving of the end 322' of the second hinge housing 322 in contact therewith.

Friction consistently occurs with the end 322' of the second hinge housing 322 enough to generate noise. Accordingly, the blocked end of the accommodating portion 321' may be made of POM (Poly Oxy Methylene). POM is a polymer of formaldehyde which is a kind of polyacetal. Such POM has a high tensile strength and a high fatigue resistance and generates no noise.

Instead of the 3-shaped plate spring, a spring 328 configured to pull a cam block 327 with one end having unevenness is formed toward the other x-axis direction side may be used as the elastic member. While the end of the cam block 327 contacts with the guide pin 326, the unevenness projected from the cam block 327 may provide the tactile feeling of the distinguishing that the angel is varied and pull the cam block toward the other x-axis side, only to solve the problem of the shaking first and second hinge housings 321 and 322.

Figure 12:
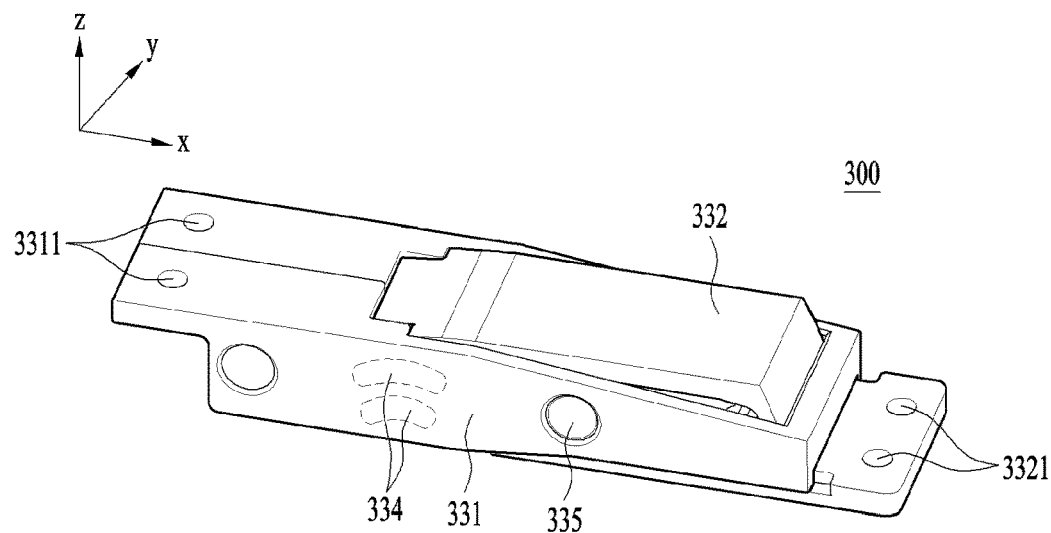
FIG. 12 is a perspective diagram illustrating a third embodiment of the hinge module.
Figure 13:
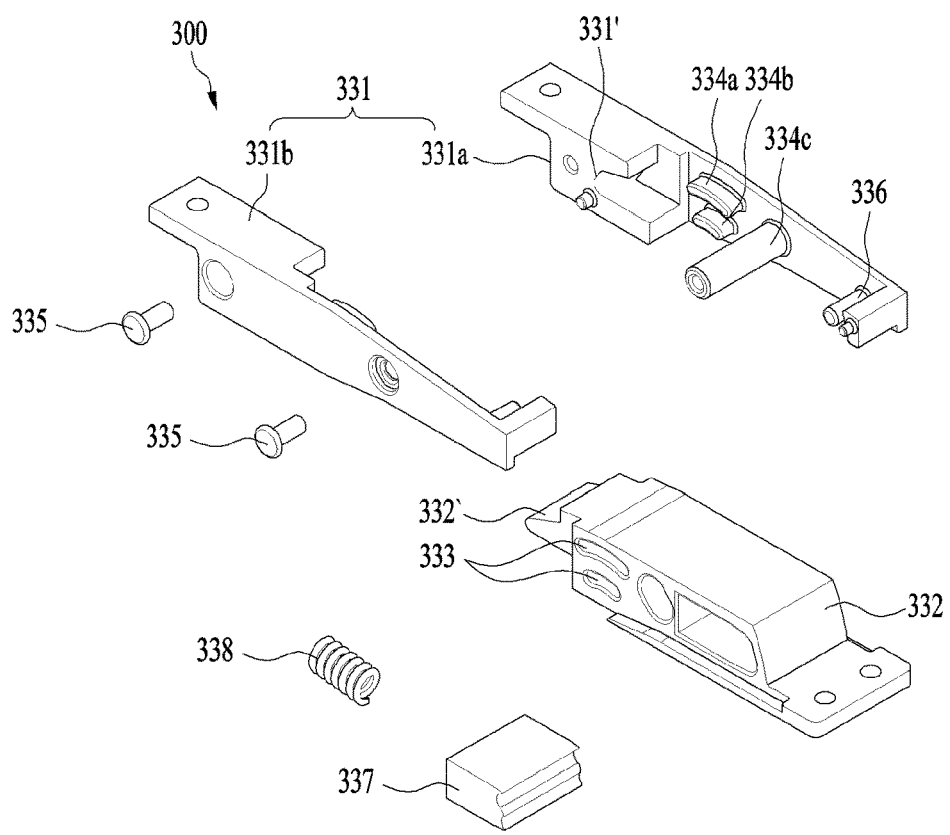
FIG. 13 is an exploded perspective diagram illustrating the hinge module of FIG. 12.
Figure 14:
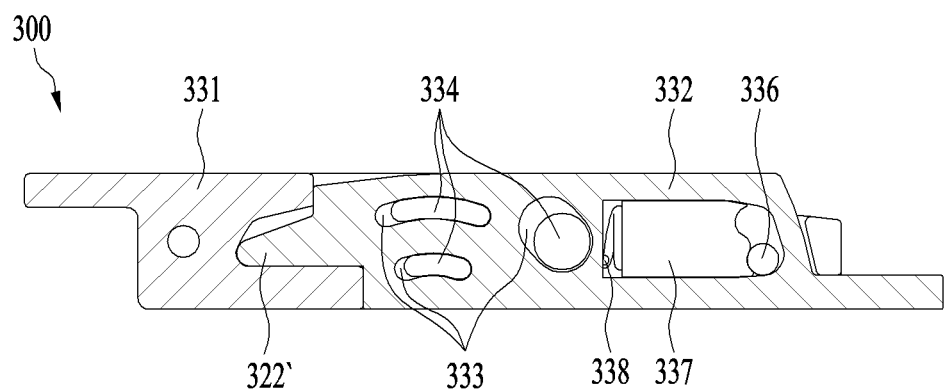
FIG. 14 is a side view illustrating the hinge module of FIG. 12.
Figure 14:
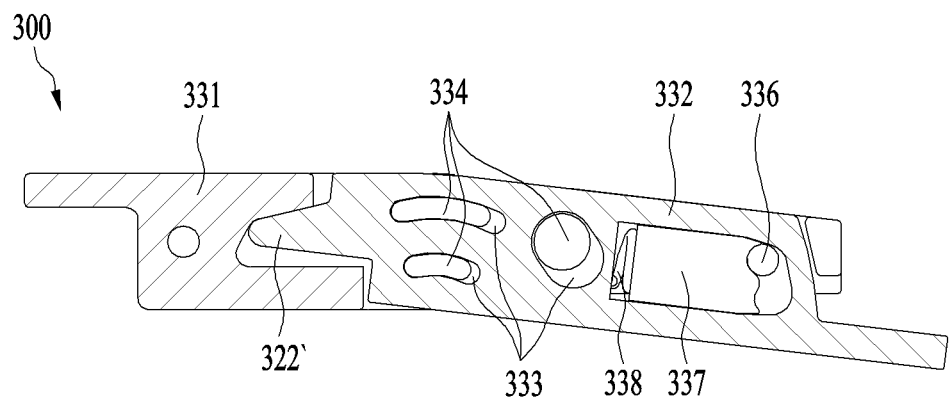

FIG. 12 is a perspective diagram illustrating a third embodiment of the hinge module 300 and FIG. 13 is an exploded perspective diagram illustrating the hinge module 300 of FIG. 12. FIG. 14 is a side view illustrating the hinge module 300 of FIG. 12. This embodiment of the hinge module 300 includes a first hinge housing 331; a second hinge housing 332; an accommodating portion 331'; a hinge hole 333; a hinge pin 334a, 334b and 334c; a guide pin 336; an elastic member 338; and a cam block 337.

This embodiment of the hinge module is different from the above embodiment in the shape of the first hinge housing 331, the hinge pin 334a, 334b and 334c and the shape of the hinge hole 333.

A hole 3311 and 3321 in which the screw is inserted may be provided to as to stably couple the first hinge housing 331 and the second hinge housing 332 to the first body 21 and the second bodies 220.

The first hinge housing 331 of the hinge module 300 in accordance with this embodiment may be configured of two cases 331a and 331b which are coupled to each other in both sides so as to cover the second hinge housing 332. In addition, the hinge pin 334 and the guide pin 336 may be integrally formed with the first hinge housing 331 as one body and the durability of the hinge pin 334 and the guide pin 336 is better than the durability of the corresponding ones of the above embodiment.

For the durability, the hinge pin 334 may be formed in an arc-shape, not the pin shape. The hinge hole 333 may be formed in a longer arc-shape than the hinge pin 334. In this embodiment, three hinge pins are provided to strengthen the durability and configured to prevent the problem of the falling out of the first and second hinge housings 331 and 332. A hole may be formed in the hinge pin 334c and a fixing pin 335 may be inserted in the hole so as to couple a pair of cases 331a and 331b provided in the first hinge housing 331 to each other. The end 332' of the second hinge housing 332 inserted into the accommodation portion 331' of the first housing 331 is also shown in FIGS. 13 and 14.

Figure 15:
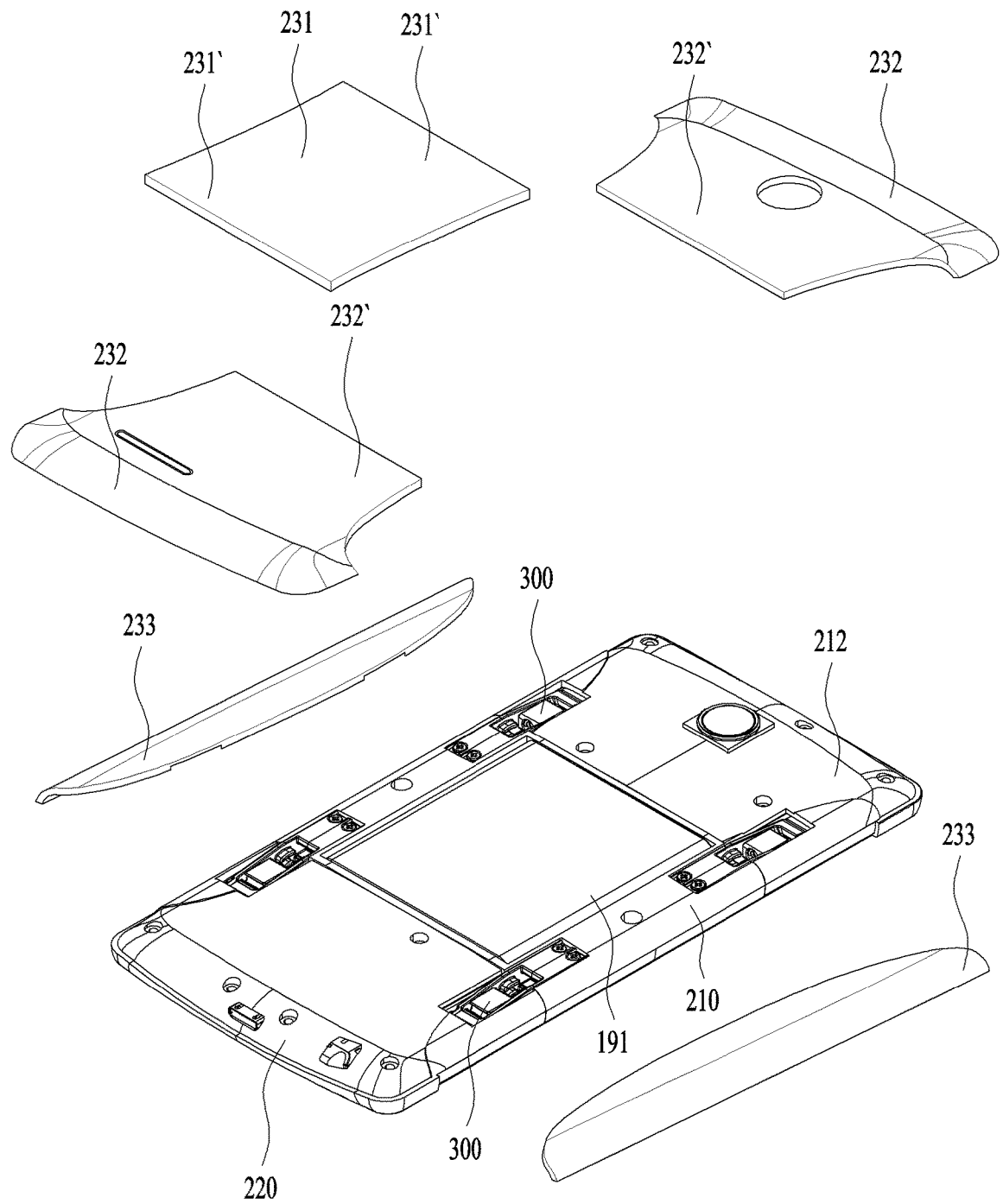
FIG. 15 is an exploded perspective diagram illustrating a terminal body and a rear case which are provided in the mobile terminal.
Figure 16:
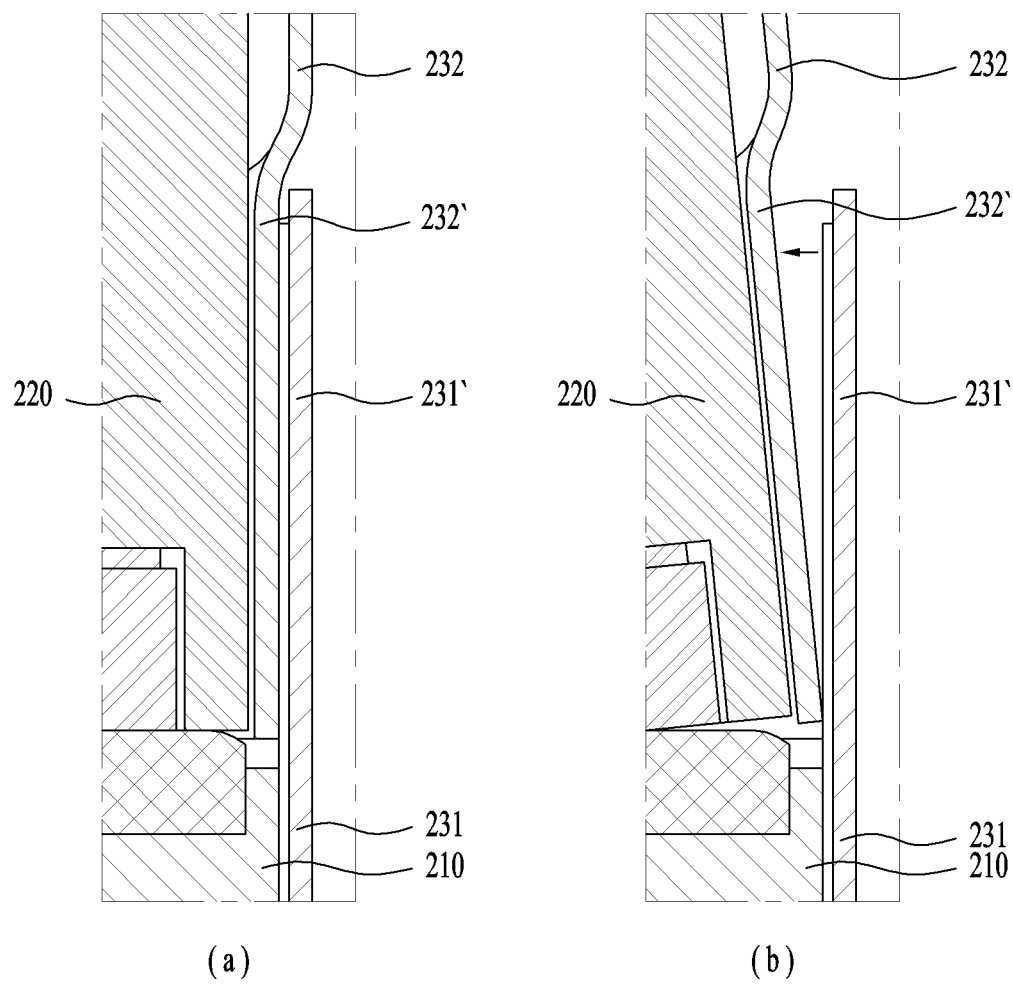
FIG. 16 is a sectional diagram illustrating a connection unit between the terminal body and the rear case of the mobile terminal.

FIG. 15 is an exploded perspective diagram illustrating a terminal body and a rear case 230 which are provided in the mobile terminal and FIG. 16 is a sectional diagram illustrating a connection unit between the bodies 210 and 220 and the rear case 230 of the mobile terminal.

When the first body 210 and the second bodies 220 are bendable as shown in FIG. 2, the rear case 230 may be made of an elastic material such as rubber, silicon or polyurethane. Such a material will looks massive and heavy by its characteristic and is likely to put stress on the hinge module 300 because of its force of restitution which tends to return to its original shape. Accordingly, the elastic material may be used in a predetermined area of the rear case and the other area is configured of the segment structure.

Referring to FIG. 15, the rear case 230 may include a first cover 231 coupled to the first body 210; a second cover 232 coupled to the second body 220; a pair of elastic covers 233 configured to cover lateral surfaces of the second body. In case two second bodies 220 are provided, a pair of second covers 232 may be provided as shown in FIG. 15.

The first cover 231 and the second cover 232 may be coupled to the first body 210 and the second body 220, respectively, so that they can move together when the angle between the first body 210 and the second body 220 is varied. At this time, an extended portion 231' may be extended from one end of the first cover 231 toward the second body 220 so as to prevent the space between the first body 210 and the second body 220 from being exposed toward the rear surface.

As shown in FIG. 16, the extended portion 231' may be overlapped with the second cover 232 and the second cover 232 may be formed thinner at a portion 232' corresponding to the extended portion 231'. When the second body 210 and the second body 220 are spread or unfolded, the rear surface of the first cover 231 and the rear surface of the second cover 232 may form the same plane.

The elastic cover 233 arranged in right and left surfaces of the first and second covers 231 and 232 may be made of an elastic material such as rubber, silicon or polyurethane. The elastic cover 233 may cover the widened area between the first body 210 and the second body 220 and the lateral surface which is bending when the angle between the first and second bodies 210 and 220 is varied not to be exposed outside.

As mentioned above, the mobile terminal in accordance with at least one of the embodiments may adjust the bending degree of the mobile terminal. Accordingly, the sense of immersion into the screen may be enhanced by adjusting the curvature of the mobile terminal and it may be convenient of the user to rest the mobile terminal easily.

Furthermore, when the mobile terminal is bendably deformed, the surface of the terminal body, on which the display unit 151 is disposed, may have no length variation. Accordingly, the sliding member of the display unit 151 may be omitted and the structure may become simple. Also, the deterioration of the durability caused by the sliding structure may be improved.

Still further, the mobile terminal may provide the tactile sense for sensing the presence of each deformation stages when the bodies are deformed into the bending state or the flat state. Accordingly, the severe deformation of the shape may be prevented and the durability may be improved.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A hinge module comprising:
a first hinge housing including an accommodating portion;
a second hinge housing having a first end inserted in the accommodating portion;
an arc-shaped hinge hole in the second hinge housing;
a hinge pin projecting from an inner surface of the accommodating portion of the first hinge housing and penetrating the arc-shaped hinge hole in the second hinge housing;
a guide pin coupled to the first hinge housing and inserted into a second end of the second hinge housing; and
an elastic member provided in the second end of the second hinge housing and including a curved surface contacting the guide pin,
wherein when an angle between the first hinge housing and the second hinge housing is changed, the guide pin moves along the curved surface of the elastic member and the hinge pin moves inside of the arc-shaped hinge hole.

2. The hinge module of claim 1, wherein the first end of the second hinge housing contacts with an end of an inner surface of the accommodating portion.

3. The hinge module of claim 2, wherein the end of the inner surface of the accommodating portion has an inclined surface which is oblique in a z-axis direction.

4. The hinge module of claim 2, further comprising:
a plate spring provided in an inner cross section of the accommodating portion and having unevenness.

5. The hinge module of claim 2, wherein an inner cross section of the accommodating portion comprises POM (Poly Oxy Methylene).

6. The hinge module of claim 1, wherein the arc-shaped hinged hole has a center point located outside of a z-axis direction of the hinge.

7. The hinge module of claim 6, wherein the arc-shaped hinge hole comprises two arc-shaped hinge holes spaced apart in the z-axis direction, and
wherein the two arc-shaped hinge holes have an arc shape with a same center point.

8. The hinge module of claim 1, wherein the elastic member comprises a plate spring coupled to the second hinge housing and has unevenness.

9. The hinge module of claim 1, wherein the elastic member comprises:
a cam block having a 3-shaped end which contacts with the guide pin; and
a spring applying a force for pulling the cam block toward the second end of the second hinge housing.

10. The hinge module of claim 1, wherein the first hinge housing comprises a pair of cases coupled from both sides in a y-axis direction.

11. The hinge module of claim 1, wherein the accommodating portion has one x-axis direction side which is blocked and the other side which is open.

12. The hinge module of claim 1, wherein the first end of the second hinge housing is an x-axis direction side of the second hinge housing.

13. The hinge module of claim 1, wherein the arc-shaped hinge hole is open in a y-axis direction, and
wherein the guide pin is coupled to a second end of the first hinge housing in an x-axis direction and protrudes in the y-axis direction.

14. A mobile terminal comprising:
a first body;
a second body arranged in an x-axis direction with respect to the first body;
a hinge module configured to facilitate an angle variation between the first body and the second body; and
a display disposed in a direction where the angle between the first body and the second body becomes smaller,
wherein the hinge module comprises:
a first hinge housing including an accommodating portion;
a second hinge housing having a first end inserted in the accommodating portion;
an arc-shaped hinge hole in the second hinge housing;
a hinge pin projecting from an inner surface of the accommodating portion of the first hinge housing and penetrating the arc-shaped hinge hole in the second hinge housing;
a guide pin coupled to the first hinge housing and inserted into a second end of the second hinge housing; and
an elastic member provided in the second end of the second hinge housing and including a curved surface contacting the guide pin, and
wherein when an angle between the first hinge housing and the second hinge housing is changed, the guide pin moves along the curved surface of the elastic member and the hinge pin moves inside of the arc-shaped hinge hole.

15. The mobile terminal of claim 14, wherein the second body comprises a pair of second bodies provided and coupled to both sides of the first body in an x-axis direction, and
wherein the hinge comprises two pair of hinge modules provided in right and left sides of the first and second bodies in a y-axis direction.

16. The mobile terminal of claim 15, wherein the two pair of hinge modules are arranged in a symmetrical manner.

17. The mobile terminal of claim 15, wherein the pair of second bodies hinge with respect to the first body.

18. The mobile terminal of claim 14, further comprising:
a rear case including:
a first cover coupled to the first body and including an overlapped portion extended toward the second body;
a second cover coupled to the second body and having a thin area where the overlapped portion is located; and
an elastic cover covering lateral surfaces between the first body and the second body from both y-axis sides of the first and second covers.

19. The mobile terminal of claim 14, wherein the display is coupled to the first body and the second body by using a boss provided in a rear surface of the display, and
wherein the boss is arranged in an area spaced apart from a connection area between the first body and the second body.

20. The mobile terminal of claim 14, wherein the second body is arranged in an x-axis direction with respect to the first body, and
wherein the display is disposed in the x-axis direction on the first body and the second body.

* * * * *